SEMICONDUCTOR MAGNETRON MODULATOR
Filed Nov. 2, 1961
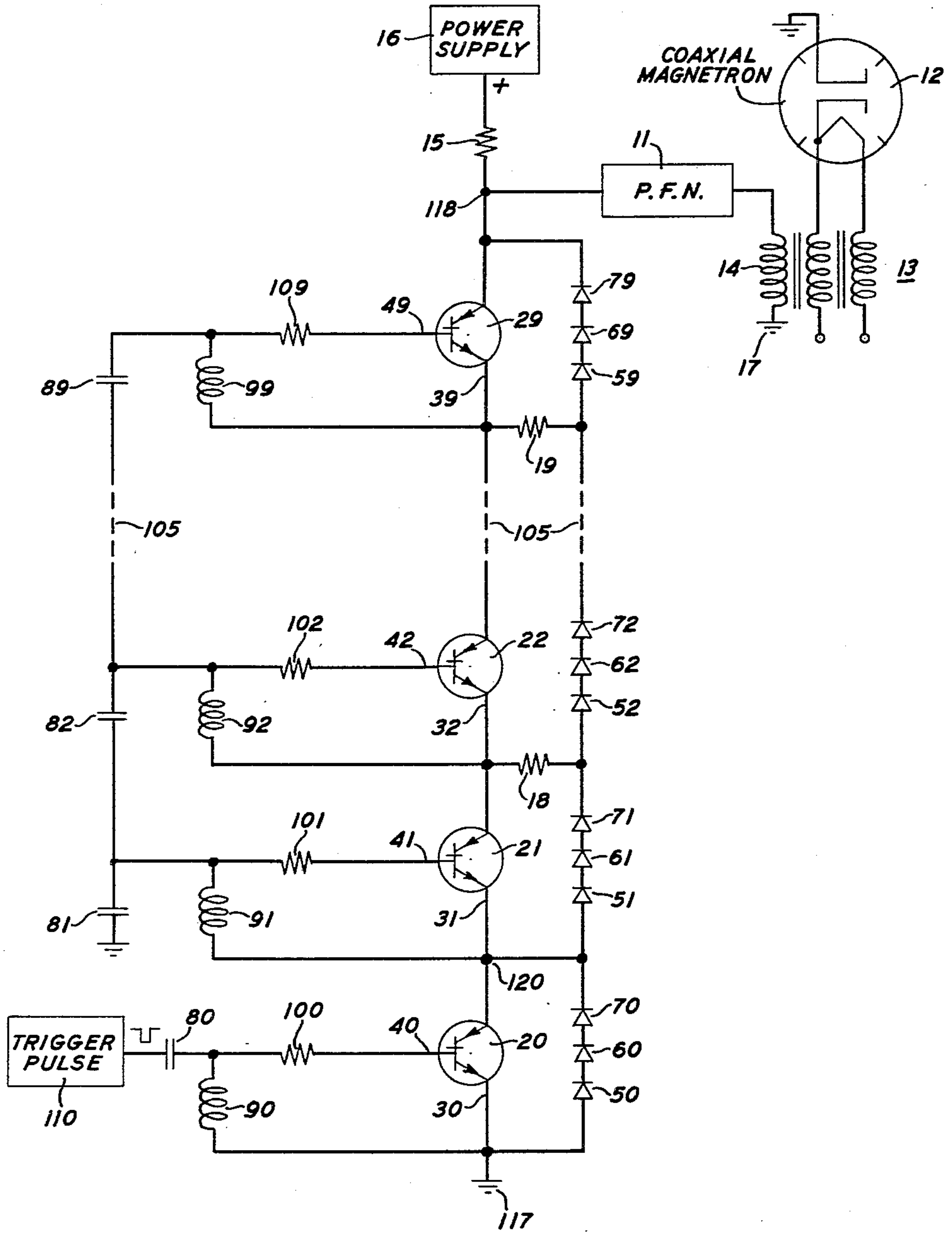
INVENTORS M. L. EMBREE
F. A. GATEKA
BY H. W. Lockhart
ATTORNEY United States Patent Office 3,135,876
Patented June 2, 1964

3,135,876

SEMICONDUCTOR MAGNETRON MODULATOR

Milton L. Embree, Laureldale, and Fredrick A. Gateka, Mount Penn, Pa., assignors to Bell Telephone Laboratories, Incorporated, New York, N.Y., a corporation of New York Filed Nov. 2, 1961, Ser. No. 150,116
3 Claims. (Cl. 307—88.5)

This invention relates to semiconductor modulator systems capable of switching relatively large amounts of power. In particular, this invention relates to a semiconductor modulator for use with a magnetron in a pulse type radar system.

In a conventional magnetron oscillator system intended for pulsed operation, a pulse-forming network is charged through an isolating or charging impedance from some suitable source of power. The pulse-forming network is connected across a magnetron tube through a pulse transformer. A trigger device or electronic switch then is required for periodically causing the pulse-forming network to discharge through the transformer into the magnetron. Pulses of the order of several hundred kilovolts are typical in radar systems. In the past, such switches have included thyratrons which have drawbacks from the standpoint of size and lifetime and require considerable routine maintenance. Insofar as applicants are aware, there have been as yet no practical systems utilizing semiconductor devices which are capable of switching these high levels of power. In accordance with this invention, there is provided an electronic switch comprising a plurality of three-terminal PNPN semiconductor devices in a transmission path for controlling the power supplied by such a pulse-forming network.

An object, therefore, of this invention is an improved modulator for switching at relatively high levels of power.

More specifically, an object is a magnetron modulator having improved efficiency, reliability and increased lifetime.

In addition, an object of this invention is a more rugged modulator having greater compactness and lighter weight.

In one basic form the semiconductor modulator of this invention comprises a series arrangement of PNPN semiconductor triodes enabling a transmission path therethrough. The power supply for pulsing the magnetron is applied across this series array, the number of PNPN triodes used being a function of the applied voltage. A pulse-forming network of the L.-C. type is connected in circuit with the series array of triodes so that when the PNPN triodes all assume the low impedance condition this virtual short circuit enables discharge of a current pulse to the primary of the pulse transformer which is serially connected with the pulse-forming network.

Switching of the PNPN triodes from the high to the low impedance condition substantially simultaneously and in a short time is accomplished by first triggering the triode at the low potential end of the series string. A series of capacitors is connected in circuit between successive gate electrodes of the triodes. In addition, a direct-current path through an inductor is provided between the gate and emitter connections of each triode thereby assuring a relatively low potential difference between these two points. A voltage-stabilizing network parallels the string of triodes so that when the end triode is triggered into the low impedance condition, the gate as well as the emitter of each PNPN triode undergoes a drop in potential similar to that exhibited by the initially triggered triode. This enables the discharge of the gate circuit capacitors which have been previously charged from the power supply into their respective gate electrodes which triggers each triode into the low impedance condition. This occurs simultaneously for the balance of the PNPN triodes and provides the closed switch or transmission path for discharging the pulse-forming network through the primary of the pulse transformer.

Advantageously, the voltage across each triode is stabilized typically by the use of voltage regulator diodes to prevent unequal voltage drops which might result in values in excess of the breakdown voltage of a particular triode. In addition, current-limiting resistors may be advantageously provided in the gate circuit as well as the power supply circuit.

A feature of this invention is a semiconductor modulator using PNPN semiconductor triodes in a circuit in which a multiplicity of such triodes may be included to enable handling high voltages while, at the same time, retaining desired switching characteristics of the PNPN device.

The use of semiconductor devices improves the efficiency of the switching arrangement as compared to the use of electron discharge devices inasmuch as energy is not required for heating filaments and also the voltage drop occurring across the semiconductor elements in the low impedance state is smaller.

The invention and its other objects and features will be more clearly understood from the following detailed description taken in conjunction with the drawing which shows in schematic form one typical embodiment of the semiconductor magnetron modulator.

Referring to the drawing, the magnetron 12, which typically may be of a coaxial type, for example, a Western Electric 1951, is supplied with pulse power through the pulse transformer 13. The primary winding 14 of the transformer is serially connected with a conventional pulse-forming network 11 represented schematically in box form. Typically, such a network comprises a series-parallel array of inductors and capacitors. One terminal 118 of this series circuit is connected through a charging resistor 15 to the power supply 16. The other end of the circuit is connected to the ground terminal 17.

The electronic switch or modulator in accordance with this invention then comprises the configuration including a series of PNPN triodes forming a transmission path between a point of ground potential 117 and the terminal 118 of the pulse-forming network circuit. In this series of PNPN semiconductor triodes 20, 21, 22, . . . 29, each triode has an emitter connection 30, 31, 32, . . . 39, a gate connection 40, 41, 42, . . . 49 and another terminal connection. Specifically, in this circuit configuration using a power supply at a high positive potential, each triode in the string is arranged with the P-type terminal region at the top in the drawing and the N-type at the bottom terminal connection, and the gate connection is made to the intermediate P-type region. For ease of illustration, the omission of some triode stages is indicated by the broken lines 105.

A string of capacitors 81, 82, . . . 89 is connected between the gate connections of the triodes except for the end triode 20 nearest ground. The gate connection 40 of the end triode 20 is connected to a trigger pulse source 110 which, through a capacitor 80, initiates the switching action of the modulator. The resistors 100, 101, 102, . . . 109 are provided in the gate connection circuits to limit the gate currents to suitable values. The inductors 90, 91, 92, . . . 99 are included to provide a high pulse impedance, direct-current path between the gate and emitter connections to ensure that each triode will exhibit a high value of breakdown voltage.

Each PNPN semiconductor triode is shunted by a series of voltage regulator diodes 50—60—70, 51—61—71, et cetera, for ensuring that the change in potential occurring across the end triode 20 is transferred simultaneously to the other triodes and to ensure a more equal division of voltage across the PNPN triodes. The resistors 18 and 19 are included for current-limiting purposes.

A complete understanding of the operation of this modulator will be enchanced by a consideration of the electrical characteristics of the PNPN semiconductor triode. Viewed first as a two-terminal device, in the forward direction, that is, for example, with a more positive voltage applied to the connection to the P-type terminal region, the PNPN device will conduct only a small current of the order of microamperes. This is termed the saturation current, and this high impedance state prevails until a level of applied voltage is reached equal to the breakdown voltage. Typically, for silicon PNPN triodes intended for use in this specific embodiment, the breakdown voltage is about 400 volts. After breakdown is reached, the device switches to a low impedance state and conducts much larger currents. The device returns to the high impedance condition if the voltage applied across the terminal regions is reduced below the sustain voltage, typically about one volt. More specifically in relation to this invention, the device also may be switched to the low impedance state by supplying gate current to, in the case of the specific example, the intermediate P-type conductivity base region. When adequate current is thus supplied to the gate region, the triode switches from the high impedance to the low impedance state even though the applied voltage across the terminal regions is less than the breakdown voltage. Referring specifically to the circuit in the drawing, switching action is initiated by the application of a pulse from the source 110 to the gate connection 40 of the end triode 20 nearest ground. Full voltage is applied continuously across the array from the power supply 16 but all of the PNPN triodes initially remain in the high impedance state since the regulation voltage values of the voltage regulator diodes are chosen so that the breakdown voltage for each triode is not exceeded. However, with full voltage across both the PNPN triode string and the circuit including the pulse-forming network 11, the capacitors of the pulse-forming network are fully charged. And, similarly, the capacitors 81, 82, . . . 89 in the triode gate circuits are charged to the level existing across each triode.

The application of the current pulse to the end triode 20 causes that triode to switch to the low impedance state. This effectively lowers the voltage at the connection 120 to the next triode 21 by an amount substantially equal to the voltage drop across the triode 20. Typically, if the triodes, which may be of the Western Electric 2N1765 type, have a breakdown voltage of 400 volts, the voltage change at the connection 120 will be substantially 400 volts. Similarly, the potential at each of the other emitter connections 32, . . . 39 is simultaneously reduced by a proportionate amount determined by the value of the resistors 18—102, and 19—109. Equalization of the voltage drops is assured by the regulator diode strings 51—61—71, 52—62—72, et cetera.

The capacitors 81, 82, . . . 89, which were charged to the potential existing across each PNPN triode, now discharge current through their respective series resistors 101, 102, . . . 109 into each gate connection. This current which flows is limited by the resistors to a value less than the peak current for which the triode is rated. With the application of this current to each gate connection, each of the remaining PNPN triodes 21, 22, . . . 29 in the string switches simultaneously from a high impedance to a low impedance condition.

With this change in the impedance condition of all of the triodes, the circuit comprising the pulse-forming network 11, the primary winding 14, and the triode string is closed enabling the pulse-forming network 11 to discharge to the primary winding 14 through the transmission path comprising the PNPN semiconductor triodes 20, 21, 22, . . . 29.

As is known, the shape and length of the pulse which occurs is determined by the characteristics of the pulse-forming network 11. Since the pulse-forming network acts as a generator, when the pulse-forming network and the load are matched, the load being the primary winding of the pulse transformer, the pulse which is formed is approximately one half of the voltage to which the pulse-forming network was charged. Therefore, when matching the pulse-forming network to the load, the small "on" impedance of the PNPN triode should be included. To enable return of the PNPN triodes to the high impedance state after the pulse, it is necessary to reduce the current through them to a value less than the holding current or current which will sustain the low impedance condition of the PNPN triodes. For this purpose the value of the charging resistor 15 is chosen such that the current is limited to a value less than the holding current.

Typically in the specific configuration described, and using a 9-kilovolt power supply through a one-half megohm charging resistor 15, the modulator includes twenty PNPN triodes of the 2N1765 type, each having a rated breakdown voltage of 400 volts. Each trio of voltage regulator diodes having a total rating of 400 volts typically may comprise two 1N672 silicon diodes and one 1N671 diode. All of the limiting resistors are 1000 ohm values, the inductors each have a value of 100 microhenries, and the capacitors 80, 81, 82, . . . 89 have a value of 500 picofarads. Using this particular circuit configuration with a pulse transformer having a turns ratio of one to four and having a useful pulse generated by the pulse-forming network of 4 kilovolts at 80 amperes, the pulse provided to the magnetron was 16 kilovolts at 20 amperes with a pulse width of 1 microsecond.

As will be apparent to those skilled in the art, the voltage regulator diodes could be replaced by a series string of parallel resistors and capacitors. However, such an arrangement would be less efficient because the high impedance state equalization current of such an arrangement is higher than that of the diode configuration. The high power modulator thus described has the obvious advantages of compactness and light weight resulting from the use of semiconductor devices which are of extremely small size and weight compared to, typically, the gas tubes employed in the prior art. In addition, the modulator circuit, including semiconductor devices, has a lifetime limited only by the capabilities of the PNPN semiconductor triodes which have extremtly long life.

Moreover, the absence of heated filaments and the lesser resistance of the semiconductor devices in the "on" state enhances the overall efficiency of the modulator.

Although the invention has been described in terms of a particular specific embodiment, it will be understood that other arrangements may be devised by those skilled in the art which likewise will be within the scope and spirit of the invention.

What is claimed is:

1. In a system for providing short pulses of direct current, an electronic switch comprising a transmission path having an open and a closed condition, said path including a plurality of PNPN semiconductor triodes poled in the same direction and with their terminal regions in serial connection, first means for applying a voltage across said series of triodes which is less than the characteristic breakdown voltage of said triodes including means for equalizing the voltage applied across each triode, said means comprising asymmetrically conducting devices of the voltage regulating type, said devices having a characteristic breakover voltage which is less than the applied voltage of said first means, separate second means for applying a trigger pulse to the gate connection of the triode at the lower potential end of said series thereby to switch said triode from the high impedance to the low impedance condition, and third means activated by the switching of said end triode for triggering the remaining triodes simultaneously from the high impedance to the low impedance condition thereby to place said transmission path in the closed condition, said third means comprising a capacitance element in circuit with the gate connection of each of said remaining triodes, and circuit means enabling charging of said capacitance elements when said triodes are in the high impedance condition.

2. In a system for providing short pulses of direct current, an electronic switch comprising a transmission path having an open and a closed condition, said path including a plurality of PNPN semiconductor triodes serially connected through their terminal regions and poled in the same direction, first means for applying a voltage across said series in the forward direction which is less than the characteristic breakdown voltage of said triodes, means for equalizing the voltage applied across each triode, said means comprising asymmetrically conducting devices of the voltage regulating type, said devices having a characteristic breakover voltage which is less than the applied voltage of said first means, second means for applying an external trigger pulse to the gate connection of the triode at the lower end of said array thereby to cause said triode to switch from the high impedance to the low impedance condition, and third means activated by the switching of said end triode for triggering the remaining triodes simultaneously from the high impedance to the low impedance condition thereby to close said transmission path, said third means including an inductive circuit connected between the lower potential terminal connection of each remaining triode and the gate connection of each remaining triode, and a capacitance element connected to the gate connection of each of said remaining triodes and in parallel with said series of triodes.

3. In a magnetron oscillator system, an electronic switch in accordance with claim 2 connected in circuit with a pulse-forming network and the primary winding of a pulse transformer.

References Cited in the file of this patent

UNITED STATES PATENTS

| | | |
|---|---|---|
| 2,492,850 | De Mers | Dec. 27, 1949 |
| 2,595,301 | Sager | Mar. 6, 1952 |